United States Patent [19]

Wong

[11] 4,023,841
[45] May 17, 1977

[54] BUMPER CONSTRUCTION AND METHOD OF MAKING SAME

[75] Inventor: Lip F. Wong, Richmond, Va.

[73] Assignee: Reynolds Metals Company, Richmond, Va.

[22] Filed: Aug. 15, 1975

[21] Appl. No.: 604,959

[52] U.S. Cl. .................................. 293/98; 228/173; 293/99
[51] Int. Cl.² ........................................ B60R 19/04
[58] Field of Search ............................ 293/80–82, 293/87, 93, 94, 97–99; 29/514, 526; 228/173

[56] References Cited

UNITED STATES PATENTS

| 3,506,295 | 4/1970 | Yancey | 293/88 X |
| 3,815,946 | 6/1974 | Jullig | 293/99 |

Primary Examiner—Robert B. Reeves
Assistant Examiner—John P. Shannon
Attorney, Agent, or Firm—Glenn, Lyne, Gibbs & Clark

[57] ABSTRACT

A bumper construction for a motor vehicle and method of making same is provided wherein such construction comprises a plurality of elongated metal members each having a plurality of integral expanded metal weblike spacers extending therefrom toward an adjacent member and the weblike spacers are fixed together to hold the members in spaced relation; and a face bar is fixed to the elongated members.

6 Claims, 6 Drawing Figures

U.S. Patent　　　　May 17, 1977　　　　4,023,841
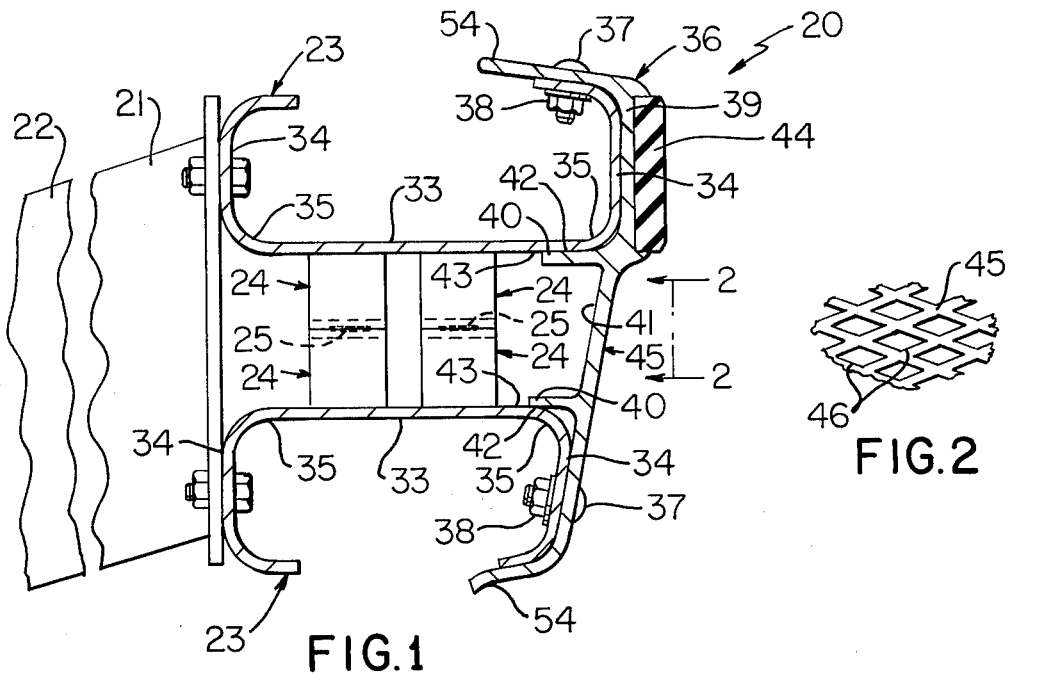
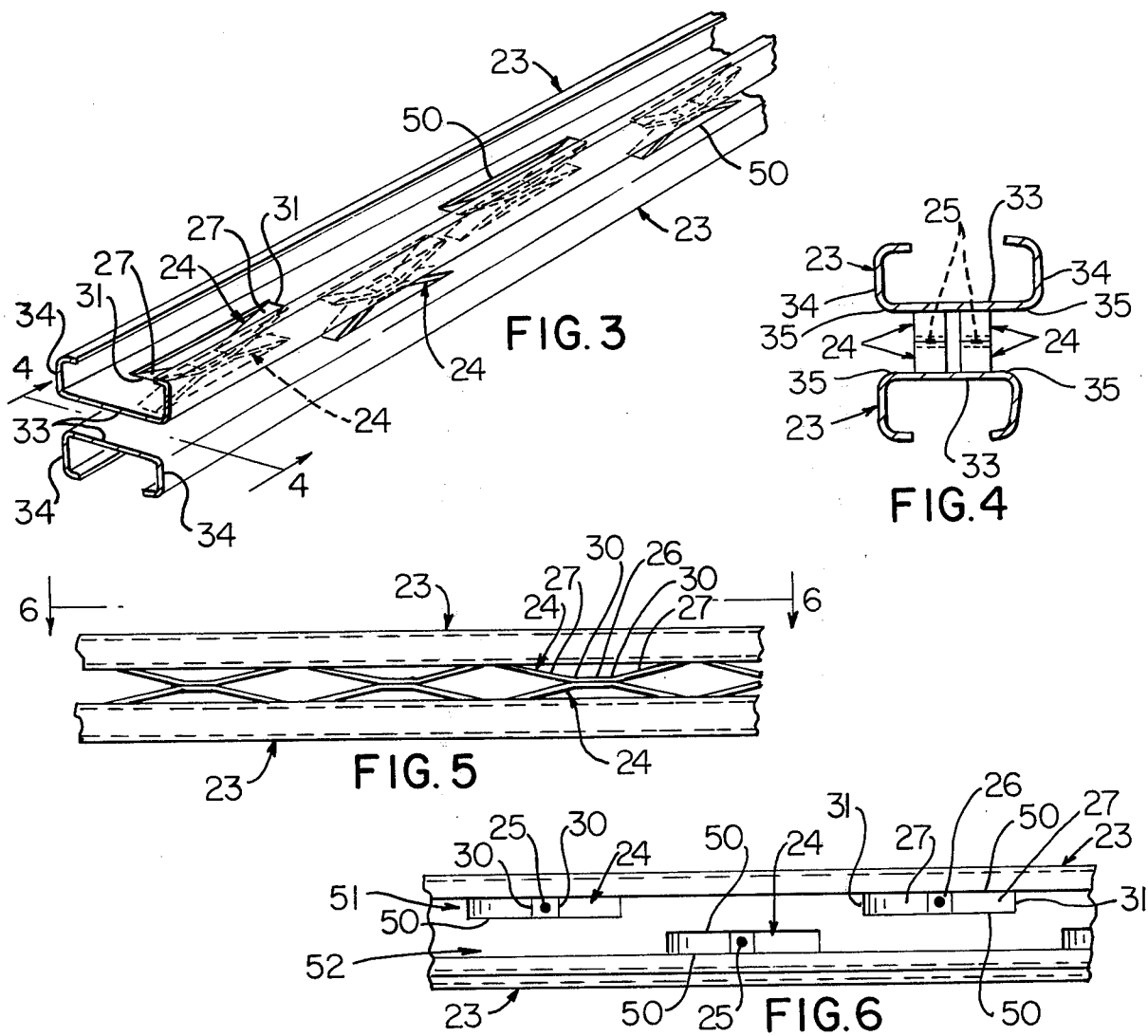

4,023,841

BUMPER CONSTRUCTION AND METHOD OF MAKING SAME

BACKGROUND OF THE INVENTION

In view of the highly competitive nature of the automobile industry and the need to conserve fuels, there is a continuing effort to produce automobile components such as bumper constructions, for example, at minimum cost and at minimum weight while providing the desired structural integrity for such bumper constructions.

SUMMARY

It is a feature of this invention to provide an improved bumper construction and method of making same wherein such bumper construction is of high structural integrity yet may be produced inexpensively and has minimum weight.

Another feature of this invention is to provide a bumper construction for a motor vehicle and method of making same which comprises a plurality of elongated metal members each having a plurality of integral expanded metal weblike spacers extending therefrom toward an adjacent member and having means fixing associated weblike spacers together to hold the members in spaced relation and with the bumper construction having a face bar fixed to the members.

Accordingly, it is an object of this invention to provide a bumper construction for a motor vehicle and method of making same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a view with parts in cross section and parts in elevation illustrating one exemplary embodiment of the bumper construction of this invention and method of making same wherein such bumper construction is shown fixed in position against an energy absorption unit at the front end of a motor vehicle in the form of an automobile;

FIG. 2 is a fragmentary view taken essentially on the line 2—2 of FIG. 1;

FIG. 3 is a fragmentary perspective view of a pair of elongated substantially C-shaped members comprising the bumper construction of this invention;

FIG. 4 is an enlarged view taken essentially on the line 4—4 of FIG. 3 and showing the C-shaped members in cross section;

FIG. 5 is a front view of the C-shaped members as illustrated in FIG. 3; and

FIG. 6 is a view taken essentially on the line 6—6 of FIG. 5.

DESCRIPTION OF ILLUSTRATED EMBODIMENTS

Reference is now made to FIG. 1 of the drawing which illustrates an exemplary bumper construction of this invention which is designated generally by the reference numeral 20 and such bumper construction is particularly adapted to be installed on an energy absorption unit 21 of an automobile 22 with only a very small fragmentary forward portion of the automobile 22 being illustrated in FIG. 1. The bumper construction 20 comprises a plurality of two elongated metal members each designated by the same general reference numeral 23, even though such members are of different size, and each of the members has a plurality of integral expanded metal weblike spacers each designated by the same reference numeral 24 extending therefrom toward the other member 23 and has means fixing associated weblike spacers 24 together to hold the members 23 in spaced relation; and, in this example of the invention such means is shown as a spot weld 25 which is provided for fixing an associated pair of weblike spacers together.

As best seen in FIGS. 3, 5, and 6, each weblike spacer 24 has a roughly U-shaped configuration defined by a bight 26 arranged in spaced relation from its associated member and a pair of legs each designated by the same reference numeral 27 extending from opposite end edges 30 of the bight 26 in a diverging manner. The legs have terminal outer ends 31 adjoining its associated member and blending smoothly therewith and it will be appreciated that each U-shaped spacer 24 is defined as an integral part of its associated member 23 by an expanded rectangular strip of material of its member 23 and inasmuch as each member 23 is made of a metallic material, each spacer 24 is defined or made as an integral part of its associated member by an expanded rectangular strip of metal and in a manner to be described in more detail subsequently.

As will be readily apparent from FIG. 1, each of the members 23 is an elongated roughly C-shaped member in that it is roughly C-shaped in cross-sectional configuration or end view. Each member 23 comprises a substantially planar main body 33 terminating in curved portions at its opposite ends with such curved portions being each designated generally by the reference numeral 34 and extending from opposite side edges 35 of the planar main body 33. It will be appreciated that each curved portion 34 of this example is curved in the usual manner to help define the usual C-shaped cross-sectional configuration.

As will be readily apparent from FIGS. 3 and 5, each weblike spacer 24 has its bight 26 arranged substantially parallel to its associated main body 33 and the legs 27 are arranged in a symmetrical manner as they extend away or diverge from their associated bight 26.

The bumper construction 20 also comprises a face bar which is designated generally by the reference numeral 36 and is suitably fixed to the members 23, and in this example is fixed to each member 23 by threaded bolts 37 and nuts 38.

The face bar 36 has a pair of integral parallel projections each designated by the same reference numeral 40 extending rearwardly therefrom in parallel relation and in a direction generally transverse the rear surface 41 of the face bar 36. Each of the projections 40 has a surface 42 arranged in face-to-face contact with an associated planar portion 23 and in particular with an associated surface 43 of an associated planar portion 23. The projections 40 cooperate with the weblike spacers 24 to hold the members 23 in spaced relation.

The bumper construction 20 also has an elastomeric strip 44 which in this example is shown as a rubber strip which is suitably fixed to a top portion of the front surface of the face bar 36; and, it will be seen that the construction and arrangement of the members 23 in this example are such that the top member 23 is wider than the bottom member 23 and once the face bar 36 is fastened in position a portion 39 thereof adjoining the top member 23 is forward of the remainder of the bar 36. The strip 44 is fixed to portion 39 and defines the forward part of the bumper construction 20. The strip 44 may be suitably fixed in position utilizing any technique known in the art such as mechanical fasteners, adhesive means, or other known techniques.

In order to provide the bumper construction 20 having minimum weight, it will be seen that the face bar 36 has an expanded metal portion 45 defined between its parallel projections 40. The expanded metal portion 45 is defined in the usual manner which is well known in the art by providing spaced slits or cuts then pulling the metal apart to define substantially diamond-shaped openings 46 in the portion 45 as illustrated in FIG. 2.

The bumper construction 20 is preferably defined by cutting a plurality of cooperating pairs of parallel slits in each main body 33 of each C-shaped member 23 and the edges defined by such slits are illustrated in FIG. 6 and each designated by the reference numerals 50. The cooperating pairs of parallel slits are defined in a plurality of parallel rows in each member 23 and shown as rows 51 and 52 in FIG. 6 whereby the members 23 are held in spaced relation by webs 24 each arranged along opposite sides of the members 23. Each rectangular strip defined between each cooperating pair of slits is expanded or stretched and formed to define an associated U-shaped spacer 24 having bight 26 and legs 27.

The strips used to define the U-shaped spacers 24 may be expanded or stretched to configurations illustrated in FIG. 5 utilizing any technique known in the art. Further, it will be appreciated that associated face-to-face flat bights 26 may be fixed in position by welds 25, as shown, or may be fixed in position utilizing any other suitable fastening means known in the art.

The metallic component members of the bumper construction 20 may be made of suitable metallic materials with all members being made of ferrous metals or a nonferrous metals such as aluminous materials. It will also be appreciated that the various metallic components of the bumper construction 20 may be made of different metallic materials. For example, the members 23 may be made of rolled steel and the face bar 36 may be made of an extruded aluminum alloy which has an expanded metal central portion 45.

It will also be appreciated that the face bar 36 may be comprised of expanded metal portions at other locations therealong such as at top and bottom locations between projections 40 and closely adjacent outer projections 54 provided at the top and bottom thereof.

While present exemplary embodiments of this invention, and methods of practicing the same, have been illustrated and described, it will be recognized that this invention may be otherwise variously embodied and practiced within the scope of the following claims.

What is claimed is:

1. A bumper construction for a motor vehicle comprising, a pair of elongated metal members each having a plurality of integral U-shaped spacers extending therefrom toward an adjacent member, and means fixing associated U-shaped spacers together to hold said members in spaced relation, each U-shaped spacer being defined as an integral part of an associated member and having a bight arranged in spaced relation from the associated member and a pair of legs extending from opposite end edges of said bight in a diverging manner, each of said legs having a terminal outer end adjoining the associated member, each of said pair of members being an elongated roughly C-shaped member comprising a substantially planar main body terminating in curved portions at opposite side edges thereof and each U-shaped spacer extending from an associated planar main body and having its bight arranged substantially parallel to its main body, said planar main bodies of said pair of C-shaped members being disposed in parallel relation with their curved portions facing in opposite directions.

2. A bumper construction as set forth in claim 1 in which each of said U-shaped spacers is fixed to an associated U-shaped spacer by fixing together the bights thereof.

3. A bumper construction as set forth in claim 1 in which said U-shaped spacers extending from a planar main body of an associated C-shaped member are disposed in a plurality of parallel rows.

4. A bumper construction for a motor vehicle comprising a plurality of elongated metal members each having a plurality of integral U-shaped spacers extending therefrom toward an adjacent member, each U-shaped spacer being defined as an integral part of its associated member and having a bight arranged in spaced relation from the associated member and a pair of legs extending from opposite end edges of said bight in a diverging manner, each of said pair of legs having terminal outer ends adjoining the associated member, means fixing associated weblike spacers together to hold said members in spaced relation, each of said members being an elongated roughly C-shaped member comprising a substantially planar main body terminating in curved portions at opposite side edges thereof and each U-shaped spacer extending from an associated planar main body and having its bight arranged substantially parallel to its main body, each of said U-shaped spacers being fixed to an associated U-shaped spacer by fixing together the bights thereof, and a face bar fixed to said members and having a front face, said face bar having a pair of integral parallel projections extending rearwardly therefrom and generally transverse to said front face, each of said projections having a surface arranged in face-to-face contact with an associated planar portion, said projections cooperating with said weblike spacers to hold said members in spaced relation.

5. A bumper construction as set forth in claim 4 in which said face bar has an elastomeric strip fixed to at least a portion of its front face.

6. A bumper construction as set forth in claim 4 in which said face bar has an expanded metal portion defined as an integral part thereof between its projections.

* * * * *